United States Patent
Matthews

(10) Patent No.: US 6,697,385 B1
(45) Date of Patent: *Feb. 24, 2004

(54) CIRCUIT(S), METHOD(S) AND ARCHITECTURE FOR CONFIGURABLE PACKET RE-TIMING IN NETWORK REPEATER HUBS

(75) Inventor: Joe P. Matthews, Savage, MN (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,982

(22) Filed: Sep. 23, 1997

(51) Int. Cl.⁷ .................................................. H04J 3/06
(52) U.S. Cl. ..................... 370/517; 370/419; 370/463; 370/501; 375/211
(58) Field of Search ................................ 370/445, 446, 370/447, 448, 517, 407, 408, 501, 315, 508, 516, 419, 463, 502, 519; 375/211

(56) References Cited

U.S. PATENT DOCUMENTS

| | | | | | |
|---|---|---|---|---|---|
| 4,677,618 A | * | 6/1987 | Haas | | 370/517 |
| 5,361,261 A | * | 11/1994 | Edem | | 370/501 |
| 5,406,559 A | * | 4/1995 | Edem et al. | | 370/516 |
| 5,600,651 A | * | 2/1997 | Molle | | 370/448 |
| 5,771,235 A | * | 6/1998 | Tang | | 370/446 |
| 5,777,996 A | * | 7/1998 | Chan | | 370/445 |
| 6,118,809 A | * | 9/2000 | Lo | | 375/211 |
| 6,295,281 B1 | * | 9/2001 | Itkowsky et al. | | 370/293 |

* cited by examiner

Primary Examiner—John Pezzlo
(74) Attorney, Agent, or Firm—Christopher P. Maiorana, P.C.

(57) ABSTRACT

A circuit comprising a first circuit and a second circuit. The first circuit may be configured to present information after a delay in response to a plurality of transmit and receive inputs. The second circuit may be configured to adjust the amount of delay prior to presenting information. The second circuit may be implemented as a state machine.

14 Claims, 3 Drawing Sheets

CIRCUIT(S), METHOD(S) AND ARCHITECTURE FOR CONFIGURABLE PACKET RE-TIMING IN NETWORK REPEATER HUBS

FIELD OF THE INVENTION

The present invention relates to computer networks generally and, more particularly, to a circuit and method for providing configurable packet re-timing in a flexible network repeater hub.

BACKGROUND OF THE INVENTION

Computer networks allow the connectivity of a number of nodes through a physical network layer. The physical layer is generally connected through a number of repeaters, often configured in a hub or core. A number of different physical layer protocols exist, such as 10baseT Ethernet, 100baseT Ethernet, etc. While certain strict protocols have been defined by the Institute of Electrical and Electronics Engineers, it is often possible to enhance the performance of a device by varying certain parameters of the repeaters. Additionally, variations of physical layer devices (PHYs) may be implemented by various computer venders introducing such protocol variations as TX, FX, etc. T4. Each particular physical layer device variation may have an ideal start of packet (SOP) delay that produces improved system performance in particular applications, such as the operation over twisted pair, fiber optic, etc.

Conventional approaches to solving the problem of providing compatibility between multiple media vender devices typically place the burden on the physical layer of the network by strictly constraining the carrier sense-to-data relationship of each of the physical devices. This type of strict constraint may force the use of devices manufactured by one vender for the entire physical layer to ensure compatibility. Single vender solutions are not desirable in a competitive market, particularly for venders other than the single vendor.

Another solution to provide compatibility between multiple media venders may incorporate extremely deep (and often inefficient) First-In-First-Out(FIFO) buffers to accommodate a mix of physical layer devices. In such a configuration, the overall performance of the repeater hub is fixed, not allowing for aggressive or conservative performance alternatives in the overall design. The conventional method generally restricts the design of the repeater hub to a narrow range of physical layer devices that conform to the strict rules of the particular carrier sensing packet data relationship. While the implementation of inefficient and unnecessarily deep FIFOs may allow some flexibility, the overall performance of the repeater hub is fixed and does not allow the dynamic optimization of the SOP delay.

SUMMARY OF THE INVENTION

The present invention concerns a circuit comprising a first circuit and a second circuit. The first circuit may be configured to present information after a delay in response to a plurality of transmit and receive inputs. The second circuit may be configured to adjust the amount of delay prior to presenting information. The second circuit may be implemented as a state machine.

The objects, features and advantages of the present invention include providing a repeater hub accessible through a media independent interface which allows for (i) dynamic control from the system agent, (ii) programmability of a start of packet delay to compensate for variable PHY latency, (iii) programmability of an output enable delay, (iv) a reduction in the overall size of internal FIFOs and (v) the ability to optimize the distance between read and write pointers of the internal FIFO based on particular system characteristics.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a circuit, method and architecture for providing registers within each individual repeater in a repeater hub. Each of the registers may be accessible via the media independent interface (MII) (i.e., a serial interface generally connected to a repeater), allowing dynamic control of the repeater hub from the system agent. This dynamic control enables a minimum size internal FIFO to be implemented and allows the ability to optimize the distance between the read and write pointers based on particular system characteristics.

Figure 1:
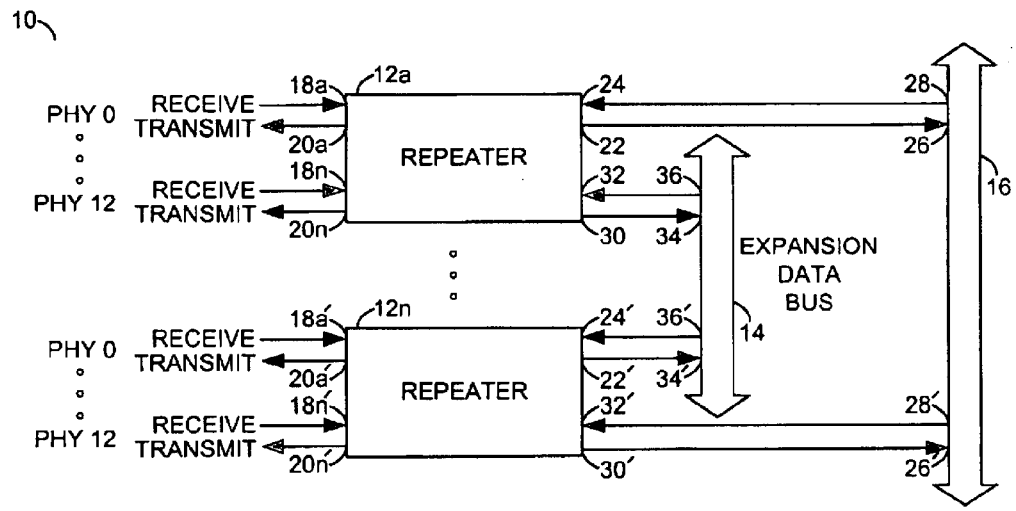
FIG. 1 is a block diagram illustrating an overview of a repeater hub.

Referring to FIG. 1, a block diagram of a repeater hub 10 is shown in accordance with a preferred embodiment of the present invention. The repeater hub 10 generally comprises a number of repeaters 12a–12n, an expansion data bus 14, and a management bus 16. The repeater 12a is shown having a number of receive inputs 18a–18n and a number of transmit outputs 20a–20n which generally operate as transmit and receive pairs. Each of the transmit and receive pairs 18a–n and 20a–n generally provides an interface to a physical layer device, shown generally as PHY0-PHY12. While twelve physical layer devices are shown, the particular number of physical layer devices connected to the repeater 12a may be adjusted accordingly to meet the design criteria of a particular application.

In addition to the repeater 12a, the repeater 12n is shown having a number of receive buses 18a'–18n' and a number of transmit outputs 20a'–20n'. Similar to the repeater 12a, each of the transmit and receive pairs 18a'–18n' and 20a'–20n' may be coupled to a particular physical layer device, shown generally as PHY0-PHY12. Similar to the repeater 12a, the particular number of physical layer devices connected to the repeater 12n may be adjusted accordingly to meet the design criteria of a particular application.

The repeater 12a is shown having an output 22 and an input 24. The output 22 is generally coupled to an input 26 of the management bus 16, while the input 24 generally receives information from an output 28 of the management bus 16. Similarly, the repeater 12a comprises an output 30 and an input 32. The output 30 generally presents data to an input 34 of the expansion data bus 14 while the input 32 generally receives data from an output 36 of the expansion data bus 14. As a result, the outputs 22 and 30, combined with the inputs 24 and 32, may provide interfaces between the repeater 12a and the expansion data bus 14 as well as between the repeater 12a and the management bus 16. The repeater 12n has inputs 24' and 32' as well as outputs 22' and 30' that may be coupled to the inputs 34' and 26' as well as the outputs 28' and 36' of the expansion data bus 14 and the management bus 16.

Since each of the repeaters 12a–12n independently presents data to the expansion data bus 14 and the management bus 16, the data transmitted by each particular repeater 12a–12n may be tuned to provide improved or enhanced performance. The particular adjustment may be conservative or aggressive in order to satisfy particular design constraints.

Figure 2:
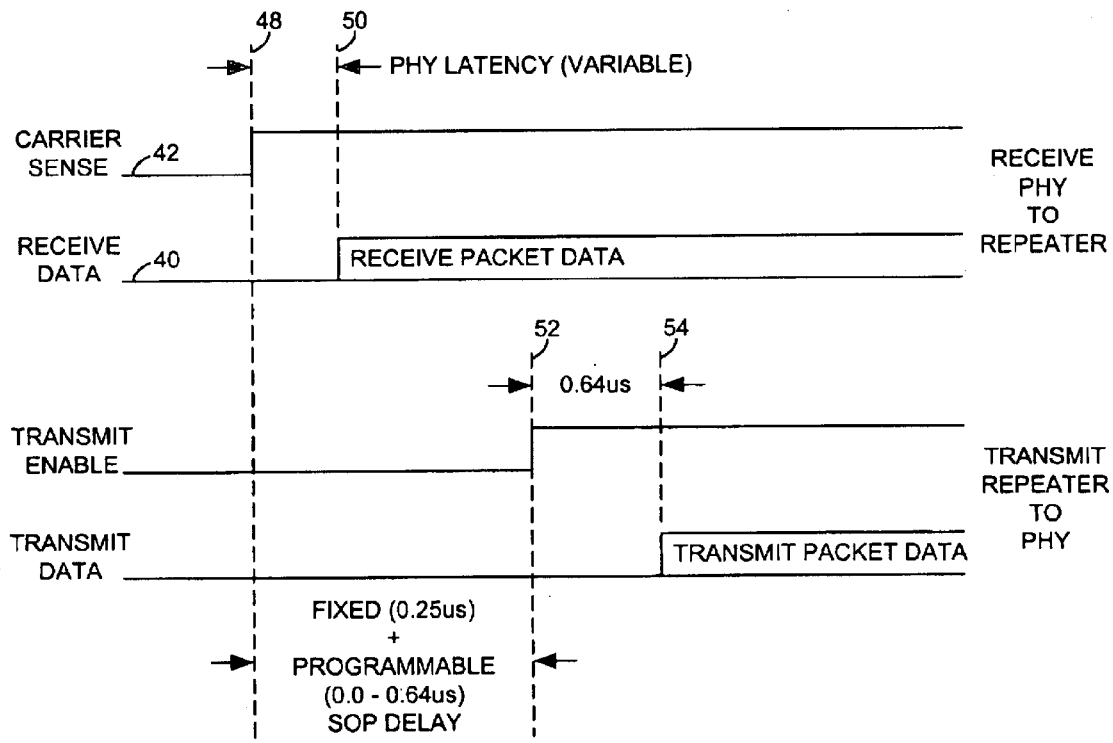
FIG. 2 is a timing diagram illustrating the physical layer variability in the carrier sense-to-data latency of each of the repeaters of FIG. 1.

Referring to FIG. 2, a timing diagram of the waveforms presented at the transmit outputs 20a–20n and the receive inputs 18a–18n is shown. The data received at the receive inputs 18a–18n is shown generally as a receive data waveform 40 and a carrier sense waveform 40. The data presented at the transmit outputs 20a–20n is generally represented as a transmit data waveform 44 and a transmit enable waveform 46. The carrier sense waveform 42 generally transitions high at a vertical line 48. The transmit enable waveform 46 generally transitions high at a vertical line 52. After the carrier sense waveform 42 transitions high, the receive data waveform 40 presents a receive data packet after a fixed plus a programmable SOP delay (generally represented as the time between the vertical line 48 and the vertical line 52). The programmable portion of the SOP delay may be adjusted for particular PHY devices (e.g., T4, FX, TX, etc.). A variable PHY latency is generally represented as the time between the vertical line 48 and the vertical line 50.

The time between the vertical line 52 and the vertical line 54 generally represents a fixed portion of the start of packet (SOP) delay. The transmit data waveform 44 generally transitions high at a vertical line 54. The time between the vertical line 52 and the vertical line 54 generally represents a fixed 0.64 μs delay that generally allows time for a packet preamble to be transmitted.

The programmable nature of the start of packet delay of the present invention generally provides a compensation at the outputs of the repeaters 12a–12n that may provide a performance enhancement over various physical layer media such as fiber optic cable, twisted pair cable, level III cable, level V cable, etc. Particular media may require (or benefit from) a shorter programmable SOP delay. Generally, the shorter the overall SOP delay (i.e., the fixed portion plus the programmable portion), the quicker the particular repeater 12a–12n may present data to the transmit outputs 20a–20n. As a result, an overall performance enhancement of the repeater 12a–12n may result. In one example, the fixed delay may be less than 0.254 μs. The programmable portion of the delay may range from between 0–0.64 μs. Additionally, the SOP delay may be used to control the distance between the read and write pointers of an internal FIFO (not shown). As a result, the size of the internal FIFO may be minimized.

Figure 3:
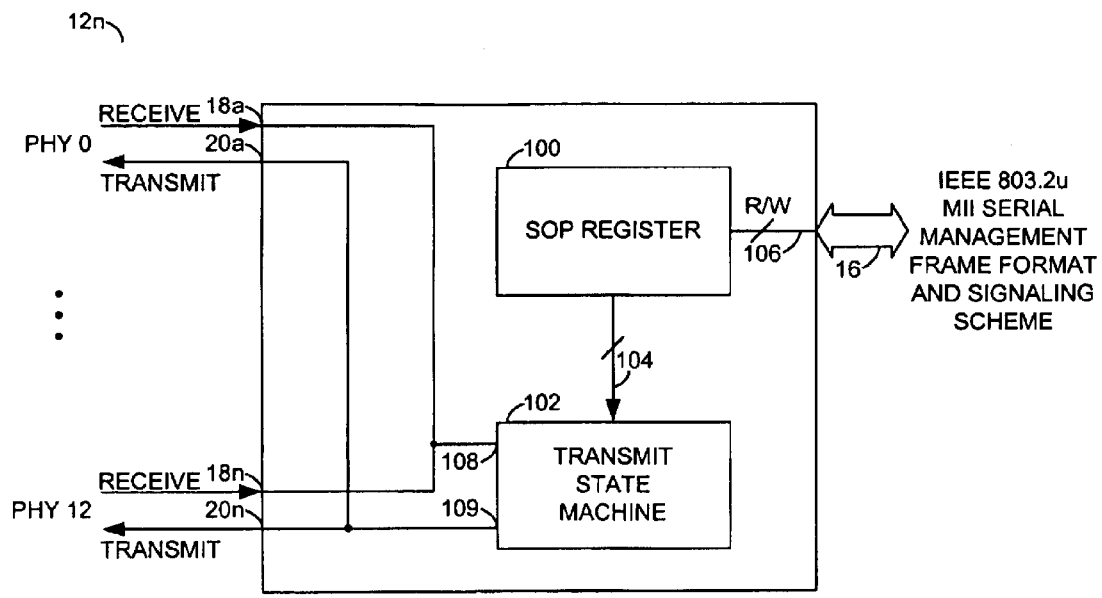
FIG. 3 is a block diagram of the internal registers of each of the repeaters of FIG. 1.

Referring to FIG. 3, a more detailed diagram of one of the repeaters 12a–12n is shown. The repeater 12n generally comprises the inputs 18a–18n and the outputs 20a–20n described in connection with FIG. 1. The repeater 12n additionally comprises a register 100 (e.g., a SOP register) and a transmit state machine 102. The register 100 generally operates (i.e., stores or presents information) when the repeater 12n is idle, which may be most of the time. For example, the repeater 12n may be idle after each packet transmission. As a result, the register 100 generally operates in the background of the repeater 12n and does not generally inhibit the overall performance. The register 100 is generally coupled to the state machine 102 through a bus 104. The register is also coupled to the management bus 16 through a read/write bus 106.

The transmit state machine 102 also comprises an input 108 that may receive information from the receive inputs 18a–18n and an output 109 that may present information to the outputs 20a–20n. The transmit state machine 102 generally presents the SOP delay at the output 109 in response to information received at the input 108 as well as information received from the bus 104. While each of the outputs 20a–20n generally responds to the same SOP delay defined by the transmit state machine 102, the particular repeaters 12a–12n generally may have independent SOP delays.

The SOP register 100 generally receives information relating to the particular performance characteristics of the repeater 12n from the management bus 16. This information may be presented by software designed to control the repeaters 12a–12n. Such software is often referred to as management software. Once the particular performance information is presented to the register 100, additional information may be re-presented in an effort to optimize the performance of the repeater 12n. During such a situation, the new performance information is generally processed by the state machine, after which a new SOP delay may be presented at the output 109. During such a reconfiguration of the SOP delay, the repeater 12n may continue to operate in the typical transmit/receive mode. As a result, the repeater 12n allows for performance adjustments to be made during a time when the overall physical network continues functioning. In one example, a 4-bit signal may be presented to the state machine 102 through the bus 104. Such a 4-bit signal may provide sixteen unique values that each may be used by the transmit state machine 102 to present different SOP delays at the output 109.

Figure 4:
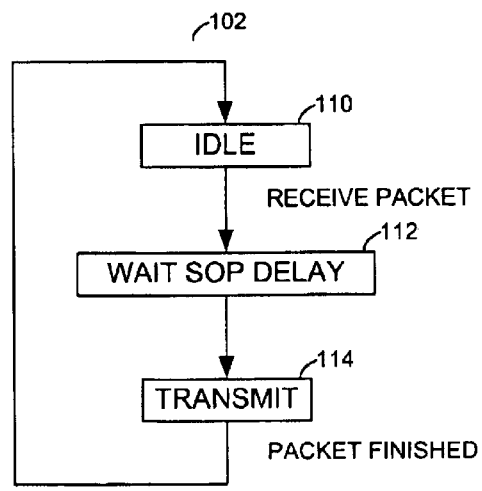
FIG. 4 is a state diagram of the state machine illustrated in FIG. 3.

Referring to FIG. 4, a functional diagram of the operation of a portion of the state machine 102 is shown. The state machine 102 generally comprises an idle state 110, a SOP delay state 112 and a transmit state 114. The idle state 110 of the transmit state machine 102 generally waits until the next packet is received before proceeding to the SOP delay state 112. As a result, if a new performance value is received by the register 100, the current packets transmitted at the outputs 20a–20n generally will not be interrupted prior to the completion of the packet transmit. The transmit state machine 102 will generally present the new SOP delay prior to the transmission of the next packets. While the transmit state machine 102 has been described in connection with presenting the SOP delay at the output 109, additional circuitry, such as a FIFO buffer (not shown) may be implemented between the receive inputs 18a–18n and the transmit outputs 20a–20n. The amount of time the FIFO holds the data, prior to the next packet transmit may be controlled by the SOP delay.

After the delay state 112, the state machine 102 progresses to the transmit state 114. The state machine 102 responds to the performance information received from the management bus 16 through the SOP register 100. The SOP delay is generally optimized for the particular physical layer devices that are operating in conjunction with the repeaters 12a–12n. The state machine 102 generally allows for dynamic configuration of the particular amount of SOP delay presented. The dynamic configuration allows for additional repeaters 12a–12n to be connected to a physical layer network, while the network is in operation, without the requirement of shutting down the entire network to execute the configuration. After the particular repeater 12a–12n is connected, the state machine 102 dynamically configures the proper amount of SOP delay to be presented at the outputs 20a–20n.

As a result of the dynamically configurable SOP delay, the repeaters 12a–12n may operate as Class I (i.e., 700 ns latency), Class II (i.e., 460 ns latency), or other class devices. Additionally, the repeaters 12a–12n may operate in either a managed (i.e., microprocessor controlled) or an unmanaged (i.e. EPROM controlled) mode.

The basic handling of the SOP delay by each of the repeaters 12a–12n generally begins with detection of the presence of an incoming frame (or data packet) reported by one of the physical layer devices. After a set delay (described in connection with FIG. 2 as the fixed plus programmable SOP delay), the repeaters 12a–12n may generate a preamble and start of frame delimiter (SFD) sequence to be presented to the management bus 16.

Figure 5:
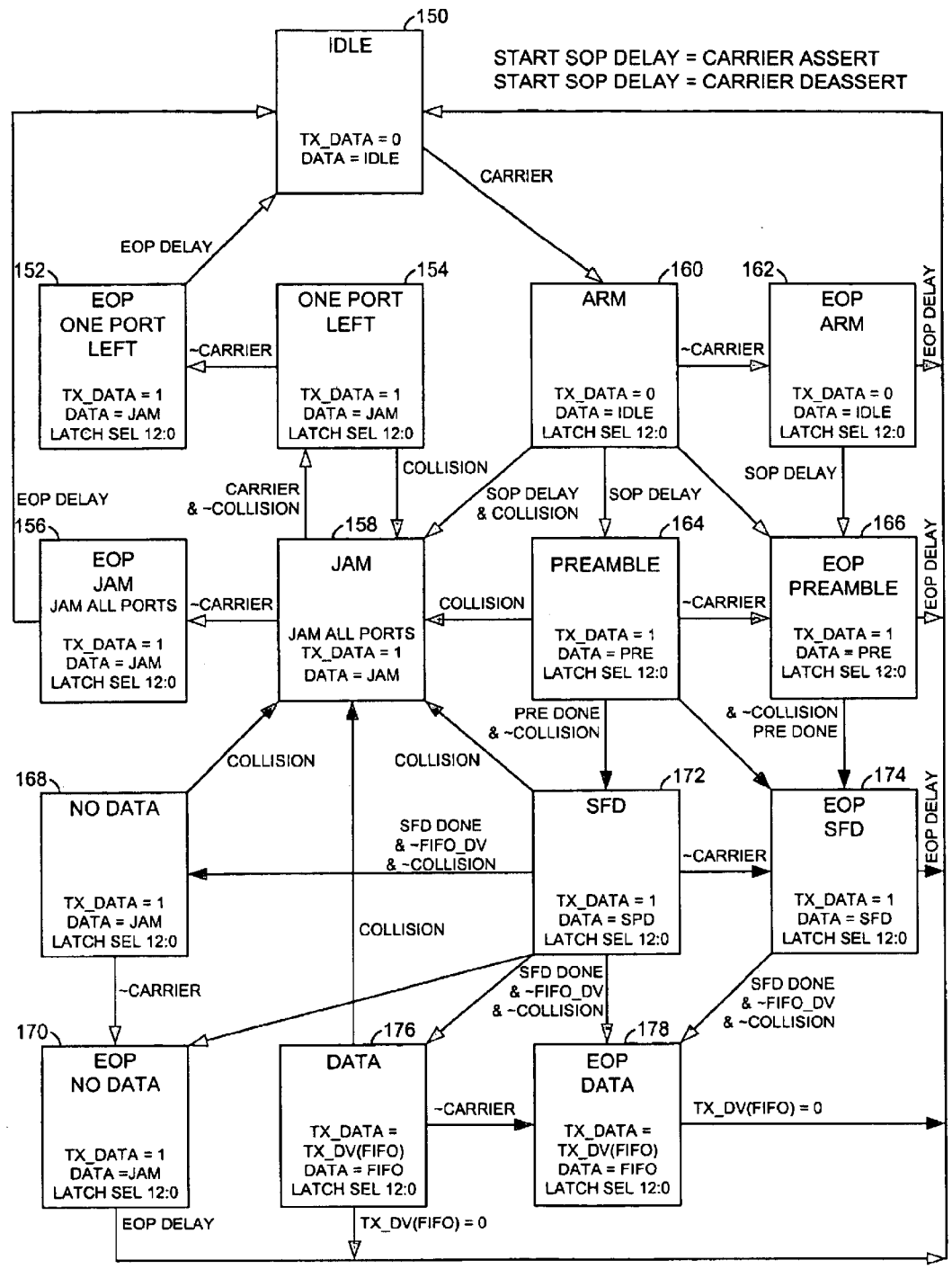
FIG. 5 is a more detailed state diagram of the state machine illustrated in FIG. 3.

Referring to FIG. 5, a more detailed state diagram of the state machine 110 is shown. The state machine generally comprises an idle state 150, an end of packet (EOP) one port left state 152, a one port left state 154, an EOP jam state 156, a jam state 158, an arm state 160, an EOP arm state 162, a preamble state 164, an EOP preamble state 166, a no data state 168, an EOP no data state 170, an SFD state 172, an EOP SFD state 174, a data state 176, and an EOP data state 178. The idle state 150 generally moves to the arm state 160 as a first transition. After the SOP delay, as determined by the information received from the SOP register 102, the arm state moves to the preamble state 164. As a result, the transition between the idle state 150, the arm state 160 and the preamble state 164 generally represents the execution of the dynamically configurable SOP delay. The additional states represent various other parameters relating to the execution of the collision detection and retransmit protocols generally implemented in an Ethernet network.

The following code illustrates one implementation of the state machine 102 that may be understood to be an example of verilog hardware description language as defined by the IEEE 1364-1995 standard:

```
module control (clk, rst, carrier, collision, tx_dv, SFD, SOPdelay, tx_data,
    idle_data, pre_data, sfd_data, fifo_check, fifo_data, jam_data, jam_all_ports,
        nodata_data, quiet_data, idle, eopd, state, dataPathEn);

input           clk;                    // Input, reference clock
input           rst;                    // Input, sync reset
input           carrier;                // Input, indicates carrier asserted
input           collision;              // Input, indicates collision condition
input           tx_dv;                  // Input, marker from FIFO, 1 = xmit data
input           SFD;                    // start of frame detected from FIFO
input   [3:0]   SOPdelay;               // SOPdelay bit from registerFile
input           dataPathEn;
output          tx_data;                // Output, global TX data signal to all ports
output          idle_data;              // signal to datapath to transmit idle
output          pre_data;               // signal to datapath to transmit preamble
output          sfd_data;               // signal to dataPath to transmit SFD
output          fifo_check;             // fifoError for underflow/overflow check
output          fifo_data;              // signal to dataPath to transmit fifo data
output          nodata_data;            // signal to dataPath to transmit rx_er
output          quiet_data;             // signal to activity in ONE_PORT_LEFT state
output          jam_data;               // signal to dataPath to transmit jam
output          jam_all_ports;          // signal to ports indicating jam all ports
output          idle;                   // signal to ports indicating idle state
output          sopd;                   // signal to activity to latch select lines
output  [3:0]   state;
reg     [3:0]   state,newState;
reg             tx_data_state;
reg             idle_data;
reg             pre_data;
reg             sfd_data;
reg             fifo_data;
reg             nodata_data;
reg             quiet_data;
reg             fifo_check;
reg             jam_data;
reg             jam_all_ports;
reg             eopd;
reg             idle;
reg             any_carrier; // a reduction OR of the carrier shift register
reg     [16:0]  sop_delay, new_sop_delay;
reg     [3:0]   preamble_timer, new_preamble_timer;
reg             all_carrier; // the carrier shift register is full (all 1's)
wire    [3:0]   sopdelay;
wire            tx_data;
wire            sop_delay_done;
wire            sop_delay_done;
wire            preamble_done;
always @(sop_delay or SOPdelay)
    case(SOPdelay)
        0,1,2: begin
```

-continued

```
module control (clk, rst, carrier, collision, tx_dv, SFD, SOPdelay, tx_data,
    idle_data, pre_data, sfd_data, fifo_check, fifo_data, jam_data, jam_all_ports,
        nodata_data, quiet_data, idle, eopd, state, dataPathEn);

any_carrier = |sop_delay[1:0];
                all_carrier = &sop_delay[3:0];
            end
        3: begin
                any_carrier = |sop_delay[2:0];
                all_carrier = &sop_delay[4:0];
            end
        4: begin
                any_carrier = |sop_delay[3:0];
                all_carrier = &sop_delay[5:0];
            end
        5: begin
                any_carrier = |sop_delay[4:0];
                all_carrier = &sop_delay[6:0];
            end
        6: begin
                any_carrier = |sop_delay[5:0];
                all_carrier = &sop_delay[7:0];
            end
        7: begin
                any_carrier = |sop_delay[6:0];
                all_carrier = &sop_delay[8:0];
            end
        8: begin
                any_carrier = |sop_delay[7:0];
                all_carrier = &sop_delay[9:0];
            end
        9: begin
                any_carrier = |sop_delay[8:0];
                all_carrier = &sop_delay[10:0];
            end
        10: begin
                any_carrier = |sop_delay[9:0];
                all_carrier = &sop_delay[11:0];
            end
        11: begin
                any_carrier = |sop_delay[10:0];
                all_carrier = &sop_delay[12:0];
            end
        12: begin
                any_carrier = |sop_delay[11:0];
                all_carrier = &sop_delay[13:0];
            end
        13: begin
                any_carrier = |sop_delay[12:0];
                all_carrier = &sop_delay[14:0];
            end
        14: begin
                any_carrier = |sop_delay[13:0];
                all_carrier = &sop_delay[15:0];
            end
        15: begin
                any_carrier = |sop_delay[14:0];
                all_carrier = &sop_delay[16:0];
            end
    endcase
assign sopdelay = (SOPdelay < 4'b0010) ? 4'b0010 : SOPdelay;
assign sop_delay_done = !sop_delay[sopdelay+1] && sop_delay[sopdelay];
assign eop_delay_done = sop_delay[sopdelay+1] && !sop_delay[sopdelay];
//** 15 clock cycles of preamble nibble 5 transmitted
assign preamble_done = ~1 (preamble_timer ^ 4'b1110);
//** the following line turns off TX_EN one cycle ahead of the SM
assign tx_data              = fifo_data ? tx_dv : tx_data_state;
parameter [3:0]             // synopsys enum port_state_info
    IDLE_STATE              = 4'b0000,
    ARM_STATE               = 4'b0001,
    PRE_STATE               = 4'b0010,
    SFD_STATE               = 4'b0011,
    JAM_STATE               = 4'b0100,
    DATA_STATE              = 4'b0101,
    NO_SFD_OR_DATA_STATE    = 4'b0110,
    ONE_PORT_LEFT_STATE     = 4'b0111,
    EOP_ARM_STATE           = 4'b1000,
    EOP_PRE_STATE           = 4'b1001,
    EOP_SFD_STATE           = 4'b1010,
    EOP_DATA_STATE          = 4'b1011,
```

-continued

```
    module control (clk, rst, carrier, collision, tx_dv, SFD, SOPdelay, tx_data,
idle_data, pre_data, sfd_data, fifo_check, fifo_data, jam_data, jam_all_ports,
           nodata_data, quiet_data, idle, eopd, state, dataPathEn);

EOP_NO_SFD_OR_DATA_STATE    = 4'b1100,
    EOP_JAM_STATE               = 4'b1101,
    EOP_ONE_PORT_LEFT_STATE     = 4'b1110,
    WAIT_FOR_EOP_DATA_STATE     = 4'b1111;
                                        // synopsys state_vector state
always @(sop_delay or carrier)
    begin
        new_sop_delay[0]    = carrier;
        new_sop_delay[16:1] = sop_delay[15:0];
    end
always @(pre_data or preamble_timer)
    new_preamble_timer = pre_data ? preamble_timer + 1 : 0;
always @(state or collision or carrier or SFD or tx_dv or sop_delay
            or any_carrier or eop_delay_done or sop_delay_done or
            preamble_done or all_carrier or dataPathEn)
    case(state)
        IDLE_STATE:
            begin
                idle_data       = 1;
                pre_data        = 0;
                sfd_data        = 0;
                fifo_check      = 0;
                fifo_data       = 0;
                nodata_data     = 0;
                quiet_data      = 0;
                jam_data        = 0;
                eopd            = 0;
                idle            = 1;
                jam_all_ports   = 0;
                tx_data_state   = 0;
                if(!dataPathEn)
                    newState = IDLE_STATE;
                else if(collision)
                    newState = JAM_STATE;
                else if(carrier || any_carrier)
                    newState = ARM_STATE;
                else
                    newState = IDLE_STATE;
            end
        ARM_STATE:
            begin
                idle_data       = 1;
                pre_data        = 0;
                sfd_data        = 0;
                fifo_check      = 0;
                fifo_data       = 0;
                nodata_data     = 0;
                quiet_data      = 0;
                jam_data        = 0;
                eopd            = 1;
                idle            = 1;
                jam_all_ports   = 0;
                tx_data_state   = 0;
                if(!dataPathEn)
                    newState = IDLE_STATE;
                else if (!carrier && sop_delay_done)
                    newState = EOP_PRE_STATE;
                else if (!carrier)
                    newState = EOP_ARM_STATE;
                else if(collision && sop_delay_done)
                    newState = JAM_STATE;
                else if(carrier && (sop_delay_done || all_carrier))
                    newState = PRE_STATE;
                else
                    newState = ARM_STATE;
            end
        EOP_ARM_STATE:
            begin
                idle_data       = 1;
                pre_data        = 0;
                sfd_data        = 0;
                fifo_check      = 0;
                fifo_data       = 0;
                nodata_data     = 0;
                quiet_data      = 0;
```

```
module control (clk, rst, carrier, collision, tx_dv, SFD, SOPdelay, tx_data,
    idle_data, pre_data, sfd_data, fifo_check, fifo_data, jam_data, jam_all_ports,
        nodata_data, quiet_data, idle, eopd, state, dataPathEn);
                        jam_data          = 0;
                        eopd              = 1;
                        idle              = 1;
                        jam_all_ports     = 0;
                        tx_data_state     = 0;
                        if(!dataPathEn || sop_delay_done || !any_carrier || !sop_delay)
                            newState = IDLE_STATE;
                        else if(sop_delay_done)
                            newState = EOP_PRE_STATE;
                        else
                            newState = EOP_ARM_STATE;
                    end
                PRE_STATE:
                    begin
                        idle_data         = 0;
                        pre_data          = 1;
                        sfd_data          = 0;
                        fifo_check        = 0;
                        fifo_data         = 0;
                        nodata_data       = 0;
                        quiet_data        = 0;
                        jam_data          = 0;
                        eopd              = 1;
                        idle              = 0;
                        jam_all_ports     = 0;
                        tx_data_state     = 1;
                        if(!dataPathEn)
                            newState = IDLE_STATE;
                        else if (!carrier && preamble_done)
                            newState = EOP_SFD_STATE;
                        else if (!carrier)
                            newState = EOP_PRE_STATE;
                        else if (collision)
                            newState = JAM_STATE;
                        else if (preamble_done)
                            newState = SFD_STATE;
                        else
                            newState = PRE_STATE;
                    end
                EOP_PRE_STATE;
                    begin
                        idle_data         = 0;
                        pre_data          = 1;
                        sfd_data          = 0;
                        fifo_check        = 0;
                        fifo_data         = 0;
                        nodata_data       = 0;
                        quiet_data        = 0;
                        jam_data          = 0;
                        eopd              = 1;
                        idle              = 0;
                        jam_all_ports     = 0;
                        tx_data_state     = 1;
                        if(!dataPathEn)
                            newState = IDLE_STATE;
                        else if (sop_delay_done || !any_carrier)
                            newState = IDLE_STATE;
                        else if (preamble_done && !sop_delay_done)
                            newState = EOP_SFD_STATE;
                        else
                            newState = EOP_PRE_STATE;
                    end
                SFD_STATE;
                    begin
                        idle_data         = 0;
                        pre_data          = 0;
                        sfd_data          = 1;
                        fifo_check        = 0;
                        fifo_data         = 0;
                        nodata_data       = 0;
                        quiet_data        = 0;
                        jam_data          = 0;
                        eopd              = 1;
                        idle              = 0;
                        jam_all_ports     = 0;
```

-continued module control (clk, rst, carrier, collision, tx_dv, SFD, SOPdelay, tx_data,
idle_data, pre_data, sfd_data, fifo_check, fifo_data, jam_data, jam_all_ports,
nodata_data, quiet_data, idle, eopd, state, dataPathEn);

```
                tx_data_state   = 1;
                if(!dataPathEn)
                    newState = IDLE_STATE;
                else if (!carrier && SFD)
                    newState = EOP_DATA_STATE;
                else if (!carrier && !SFD)
                    newState = EOP_NO_SFD_OR_DATA_STATE;
                else if (collision)
                    newState = JAM_STATE;
                else if (!SFD || !tx_dv)
                    newState = NO_SFD_OR_DATA_STATE;
                else
                    newState = DATA_STATE;
            end
        EOP_SFD_STATE;
            begin
                idle_data       = 0;
                pre_data        = 0;
                sfd_data        = 1;
                fifo_check      = 0;
                fifo_data       = 0;
                nodata_data     = 0;
                quiet_data      = 0;
                jam_data        = 0;
                eopd            = 1;
                idle            = 0;
                jam_all_ports   = 0;
                tx_data_state   = 1;
                if(!dataPathEn || sop_delay_done || !any_carrier)
                    newState = IDLE_STATE;
                else if (!tx_dv || !SFD)
                    newState = EOP_NO_SFD_OR_DATA_STATE;
                else
                    newState = EOP_DATA_STATE;
            end
        DATA_STATE:
            begin
                idle_data       = 0;
                pre_data        = 0;
                sfd_data        = 0;
                fifo_check      = 1;
                fifo_data       = 1;
                nodata_data     = 0;
                quiet_data      = 0;
                jam_data        = 0;
                eopd            = 1;
                idle            = 0;
                jam_all_ports   = 0;
                tx_data_state   = 1;
                if(!dataPathEn)
                    newState = IDLE_STATE;
                else if (!carrier)
                    newState = EOP_DATA_STATE;
                else if (collision)
                    newState = JAM_STATE;
                else if (!tx_dv)
                    newState = WAIT_FOR_EOP_DATA_STATE;
                else
                    newState = DATA_STATE;
            end
        WAIT_FOR_EOP_DATA_STATE:
            begin
                idle_data       = 1;
                pre_data        = 0;
                sfd_data        = 0;
                fifo_check      = 0;
                fifo_data       = 0;
                nodata_data     = 0;
                quiet_data      = 0;
                jam_data        = 0;
                eopd            = 1;
                idle            = 0;
                jam_all_ports   = 0;
                tx_data_state   = 0;
                if(!dataPathEn || eop_delay_done)
```

-continued

```
module control (clk, rst, carrier, collision, tx_dv, SFD, SOPdelay, tx_data,
    idle_data, pre_data, sfd_data, fifo_check, fifo_data, jam_data, jam_all_ports,
            nodata_data, quiet_data, idle, eopd, state, dataPathEn);
```

```
                            newState = IDLE_STATE;
                    else if (collision)
                            newState = JAM_STATE;
                    else
                            newState = WAIT_FOR_EOP_DATA_STATE;
            end
    EOP_DATA_STATE:
            begin
                    idle_data       = 0;
                    pre_data        = 0;
                    sfd_data        = 0;
                    fifo_check      = 0;
                    fifo_data       = 1;
                    nodata_data     = 0;
                    quiet_data      = 0;
                    jam_data        = 0;
                    eopd            = 1;
                    idle            = 0;
                    jam_all_ports   = 0;
                    tx_data_state   = 1;
                    if(!dataPathEn || !tx_dv)
                            newState = IDLE_STATE;
                    else
                            newState = EOP_DATA_STATE;
            end
    JAM_STATE:
            begin
                    idle_data       = 0;
                    pre_data        = 0;
                    sfd_data        = 0;
                    fifo_check      = 0;
                    fifo_data       = 0;
                    nodata_data     = 0;
                    quiet_data      = 1;
                    jam_data        = 1;
                    eopd            = 0;
                    idle            = 0;
                    jam_all_ports   = 1;
                    tx_data_state   = 1;
                    if(!dataPathEn)
                            newState = IDLE_STATE;
                    else if(!carrier)
                            newState = EOP_JAM_STATE;
                    else if(carrier && !collision)
                            newState = ONE_PORT_LEFT_STATE;
                    else
                            newState = JAM_STATE;
            end
    EOP_JAM_STATE:
            begin
                    idle_data       = 0;
                    pre_data        = 0;
                    sfd_data        = 0;
                    fifo_check      = 0;
                    fifo_data       = 0;
                    nodata_data     = 0;
                    quiet_data      = 0;
                    jam_data        = 1;
                    eopd            = 1;
                    idle            = 0;
                    jam_all_ports   = 1;
                    tx_data_state   = 1;
                    if(!dataPathEn || ((eop_delay_done || !any_carrier) && !collision))
                            newSate = IDLE_STATE;
                    else
                            newState = EOP_JAM_STATE;
            end
    ONE_PORT_LEFT_STATE:
            begin
                    idle_data       = 0;
                    pre_data        = 0;
                    sfd_data        = 0;
                    fifo_check      = 0;
                    fifo_data       = 0;
                    nodata_data     = 0;
```

-continued

```
module control (clk, rst, carrier, collision, tx_dv, SFD, SOPdelay, tx_data,
    idle_data, pre_data, sfd_data, fifo_check, fifo_data, jam_data, jam_all_ports,
        nodata_data, quiet_data, idle, eopd, state, dataPathEn);

quiet_data      = 1;
                jam_data        = 1;
                eopd            = 1;
                idle            = 0;
                jam_all_ports   = 0;
                tx_data_state   = 1;
                if(!dataPathEn)
                    newState = IDLE_STATE;
                else if (!carrier)
                    newState = EOP_ONE_PORT_LEFT_STATE;
                else if(collision)
                    newState = JAM_STATE;
                else
                    newState = ONE_PORT_LEFT_STATE;
            end
    EOP_ONE_PORT_LEFT_STATE:
            begin
                idle_data       = 0;
                pre_data        = 0;
                sfd_data        = 0;
                fifo_check      = 0;
                fifo_data       = 0;
                nodata_data     = 0;
                quiet_data      = 0;
                jam_data        = 1;
                eopd            = 1;
                idle            = 0;
                jam_all_ports   = 0;
                tx_data_state   = 1;
                if(!dataPathEn || eop_delay_done || !any_carrier)
                    newState = IDLE_STATE;
                else
                    newState = EOP_ONE_PORT_LEFT_STATE;
            end
    NO_SFD_OR_DATA_STATE:
            begin
                idle_data       = 0;
                pre_data        = 0;
                sfd_data        = 0;
                fifo_check      = 0;
                fifo_data       = 0;
                nodata_data     = 1;
                quiet_data      = 0;
                jam_data        = 1;
                eopd            = 1;
                idle            = 0;
                jam_all_ports   = 0;
                tx_data_state   = 1;
                if(!dataPathEn)
                    newState = IDLE_STATE;
                else if(!carrier)
                    newState = EOP_NO_SFD_OR_DATA_STATE;
                else if(collision)
                    newState = JAM_STATE;
                else
                    newState = NO_SFD_OR_DATA_STATE;
            end
    EOP_NO_SFD_OR_DATA_STATE:
            begin
                idle_data       = 0;
                pre_data        = 0;
                sfd_data        = 0;
                fifo_check      = 0;
                fifo_data       = 0;
                nodata_data     = 0;
                quiet_data      = 0;
                jam_data        = 1;
                eopd            = 1;
                idle            = 0;
                jam_all_ports   = 0;
                tx_data_state   = 1;
                if(!dataPathEn || eop_delay_done || !any_carrier)
                    newState = IDLE_STATE;
                else
                    newState = EOP_NO_SFD_OR_DATA_STATE;
```

```
                    -continued module control (clk, rst, carrier, collision, tx_dv, SFD, SOPdelay, tx_data,
  idle_data, pre_data, sfd_data, fifo_check, fifo_data, jam_data, jam_all_ports,
           nodata_data, quiet_data, idle, eopd, state, dataPathEn);

end
                default:
                    begin
                        idle_data      = 0;
                        pre_data       = 0;
                        sfd_data       = 0;
                        fifo_check     = 0;
                        fifo_data      = 0;
                        nodata_data    = 0;
                        quiet_data     = 0;
                        jam_data       = 0;
                        eopd           = 0;
                        idle           = 0;
                        jam_all_ports  = 0;
                        tx_data_state  = 0;
                        newState       = IDLE_STATE;
                    end
            endcase
        always @(posedge clk or posedge rst)
            if (rst)
                begin
                    state          = IDLE_STATE;
                    sop_delay      = 0;
                    preamble_timer = 0;
                end
            else
                begin
                    state          = newState;
                    sop_delay      = new_sop_delay;
                    preamble_timer = new_preamble_timer;
                end
endmodule
```

While the code illustrated explicitly defines certain conditions, other implementations including, but not limited to, discrete logic components, may be implemented to meet the design criteria of a particular application.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a first circuit configured to send a plurality of packets of information, each of said packets being sent in response to (i) a plurality of receive data packets and (ii) a delay control signal, wherein said delay control signal configures a delay between receiving one of said receive data packets and sending one of said plurality of packets; and
   a state machine configured to adjust and present said delay control signal, wherein said state machine adjusts said delay during an idle state of said first circuit.

2. The circuit according to claim 1, wherein said delay comprises a start of packet (SOP) delay.

3. The circuit according to claim 1, wherein said delay comprises a fixed delay plus a programmable delay.

4. The circuit according to claim 3, wherein said fixed delay compensates for a physical layer device latency.

5. The circuit according to claim 1, wherein said delay is dynamically configurable.

6. The circuit according to claim 3, wherein said programmable delay is adjusted in response to information received from a register.

7. A computer readable medium containing instructions for configuring a delay in a network repeater comprising the steps of:

(a) receiving a plurality of data packets from a physical layer device;

(b) configuring a start of packet delay;

(c) sending a plurality of said data packets after said start of packet (SOP) delay;

(d) prior to step (b), generating a data packet preamble; and (e) repeating steps (a), (b), and (c) during each idle state of said repeater.

8. The method according to claim 7, further comprising the step of:

(f) executing a collision detection and retransmit protocol after step (c).

9. The method according to claim 7, wherein said computer readable medium is stored on a state machine.

10. The method according to claim 7, wherein said step of configuring said delay responds to configuration information received from a management bus.

11. A method for dynamically configuring a delay in a network repeater comprising the steps of:

(a) receiving a plurality of data packets from a physical layer device;

(b) configuring a start of packet delay;

(c) sending a plurality of said data packets after said start of packet (SOP) delay;

(d) prior to step (b), generating a data packet preamble; and (e) repeating steps (a), (b), and (c) during each idle state of said repeater.

12. The method according to claim 11, further comprising the step of:

(e) executing a collision detection and retransmit protocol after step (c).

13. The method according to claim 11, wherein said step of configuring said delay responds to configuration information received from a management bus.

14. A circuit comprising:

a first circuit configured to send a plurality of packets of information, each of said packets being sent in response to (i) a plurality of receive data packets and (ii) a delay control signal, wherein (a) said delay control signal configures a delay between receiving one of said receive data packets and sending one of said plurality of packets and (b) said delay comprises a fixed delay plus a programmable delay;

a second circuit configured to adjust and present said delay control signal; and a FIFO having a read pointer and a write pointer, said FIFO being coupled between a shared bus and said first circuit, wherein the distance between said read and write pointer are adjusted in response to said delay.

* * * * *